United States Patent [19]
Kováts et al.

[11] 3,798,784
[45] Mar. 26, 1974

[54] PROCESS AND APPARATUS FOR THE TREATMENT OF MOIST MATERIALS

[75] Inventors: Ferenc Kováts; Andor Pintér, both of Budapest, Hungary

[73] Assignee: Chinoin Gyogyszeres Vegyeszeti Termekek Gyara Rt., Budapest (Ujpest), Hungary

[22] Filed: Mar. 31, 1971

[21] Appl. No.: 130,034

[30] Foreign Application Priority Data
Mar. 31, 1970 Hungary .......................... OE 2335

[52] U.S. Cl. .......................... 34/1, 100/38, 210/71, 210/78, 34/70
[51] Int. Cl. .............................................. B01k 5/00
[58] Field of Search ............... 34/1; 100/37, 38, 92; 210/71, 78, 73; 233/11

[56] References Cited
UNITED STATES PATENTS

| | | | |
|---|---|---|---|
| 3,386,180 | 6/1968 | Balz et al. | 34/58 X |
| 3,434,220 | 3/1969 | Forster | 34/1 |
| 3,545,093 | 12/1970 | Forster | 34/1 |
| 3,678,594 | 7/1972 | Goerz et al. | 34/1 |
| 3,549,010 | 12/1970 | Marsh et al. | 210/71 |
| 3,214,798 | 11/1965 | Cook | 100/38 |
| 2,642,000 | 6/1953 | Wieking | 34/1 |
| 2,358,779 | 9/1944 | Tholl | 210/406 |
| 400,185 | 3/1889 | Bohm | 210/406 |

*Primary Examiner*—Carroll B. Dority, Jr.
*Attorney, Agent, or Firm*—Karl F. Ross; Herbert Dubno

[57] ABSTRACT

A process and an apparatus for the treatment of substances containing moisture in which electromagnetic energy is applied to the material alternately with mechanical dehumidification thereof.

2 Claims, 2 Drawing Figures

PROCESS AND APPARATUS FOR THE TREATMENT OF MOIST MATERIALS

FIELD OF THE INVENTION

This invention is directed to a process and apparatus for the treatment of moist and particulate solid materials. More particularly it is concerned with the separation of moisture from such materials.

BACKGROUND OF THE INVENTION

Several methods are known for the dehumidification of materials. On pressing, for example, moisture is separated from the solid phase of the solid-liquid system.

Filtration is basically a special case of separation by pressing, whereby the solid-liquid system penetrates a perforated filter layer, the solids are retained and thus separation of the liquid from the solid particles takes place.

The pressure difference between the two sides of the filter layer can be produced by application of overpressure e.g., a pressure higher than atmospheric, or by application of suction, e.g., pressure lower than atmospheric, or by gravity or by rotary movement. Components having considerably different specific gravities can be separated by means of sedimentation under the influence of gravity or a centrifugal force field.

The above described methods are referred to below as mechanical dehumidification.

The separation of moisture may also be carried out by means of chemical reactions. In these methods, the moisture-containing material is contacted with an agent which chemically interacts with the moisture to bring about the separation of the solid and liquid phase.

There are also known thermal operations for the removal of moisture, namely drying, evaporation, distillation and development of heat inside the material.

In the course of drying, evaporation and distillation moisture is evaporated by externally applied heat. The so called latent heat of evaporation may be supplied by conduction, convection or radiation. Thermal energy may also be generated inside the noise material by transferring energy to said material by electromagnetic radiation. In this case the electromagnetic energy is transformed into thermal energy inside the material. This process is superior to other thermal procedures since the latent heat required for evaporation is developped inside the material and the loss of heat, occurring in all other procedures, is reduced to the minimum.

When comparing the known methods for the removal of moisture, it may be seen that from the point of view of energy-demand mechanical separation methods are the most convenient. By the thermal method not only the latent heat of vaporization of the moisture to be evaporated, but also the heat corresponding to the losses, must be transferred. Chemical separation methods are inconvenient because they consist of several steps, the operating costs are increased by the price of the often expensive reagents, and the moisture must be separated from the interaction product of the chemical reaction by additional steps.

SUMMARY OF THE INVENTION

According to a feature of the present invention there is provided a process for the treatment of humid solid substances, which comprises carrying out mechanical dehumidification (as defined above) and transfer of electromagnetic energy simultaneously or one after the other.

Preferably mechanical dehumidification is combined with transfer of electromagnetic energy.

The process of the present invention is based on the recognition that under the effect of electromagnetic radiation development of heat and consequently a decrease of viscosity and/or an interaction occurs between the molecules of the solid material and those of moisture. Under appropriate conditions said effect may be increased to an extent, which enables the mechanical removal of moisture from the substance, without necessarily requiring the transfer of heat corresponding to the latent heat of vaporization, and thus a highly economical dehumidification method may be used.

Electromagnetic energy may be transferred simultaneously with the dehumidification operation or before or after same.

Dehumidification (mechanical) may be accomplished by any suitable method, conveniently by filtration, centrifuging and the like. Preferably, mechanical dehumidification and transfer of electromagnetic energy are steps used in succession. Thus one may proceed by subjecting the solid-liquid system to filtration or centrifuging, transferring electromagnetic energy, discontinuing the transfer of electromagnetic energy and continuing filtration, then again applying electromagnetic energy and continuing these alternating operations until the desired reduction of moisture content is achieved.

According to the present invention there is provided an apparatus for the treatment of humid and particularly solid substances comprising a means for the separation of moisture, which contains at least one filter layer, and a means for the transfer or introduction of electromagnetic energy.

The means for the mechanical separation of moisture may be preferably a filter or centrifuge. All types of filters and centrifuges, which enable the separation of moisture from solid materials, are suitable for the purposes of the invention. The means for the transfer or introduction of electromagnetic energy may be placed inside the dehumidification means or may also be placed outside thereof, in which case electromagnetic energy is introduced into the system by separate means.

SPECIFIC EXAMPLE

Further details of our invention are disclosed in the following example.

Wet 2-(p-aminobenzenesulfonamido)-4,6-dimethylpyrimidine is placed on a filter layer. The filter layer is supported by a 5 mm thick polymethylmetharylate plate. From above electromagnetic energy is transferred. Three minutes after the beginning of the transfer of electromagnetic energy, the moisture content is 6.5 percent, while 6 minutes later it was found to be 0.48%. Drying is carried out in a steam heated cabinet dryer for 2-4 hours and in a laboratory drying oven for 0.5-1.5 hours. It may be seen that the dehumidification time was reduced by an order of magnitude.

It is particularly advantageous that the removal of moisture occurs at a constant rate; in the first 3 minutes 6.0 percent, while in the second 5 minutes a further 6.0 percent. By the known drying methods, the decrease of weight of the humid material is very quick at the beginning and later at the end of the drying procedure is slows down significantly. It is particularly advantageous that the temperature of the material does not increase under the effect of the radiation.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
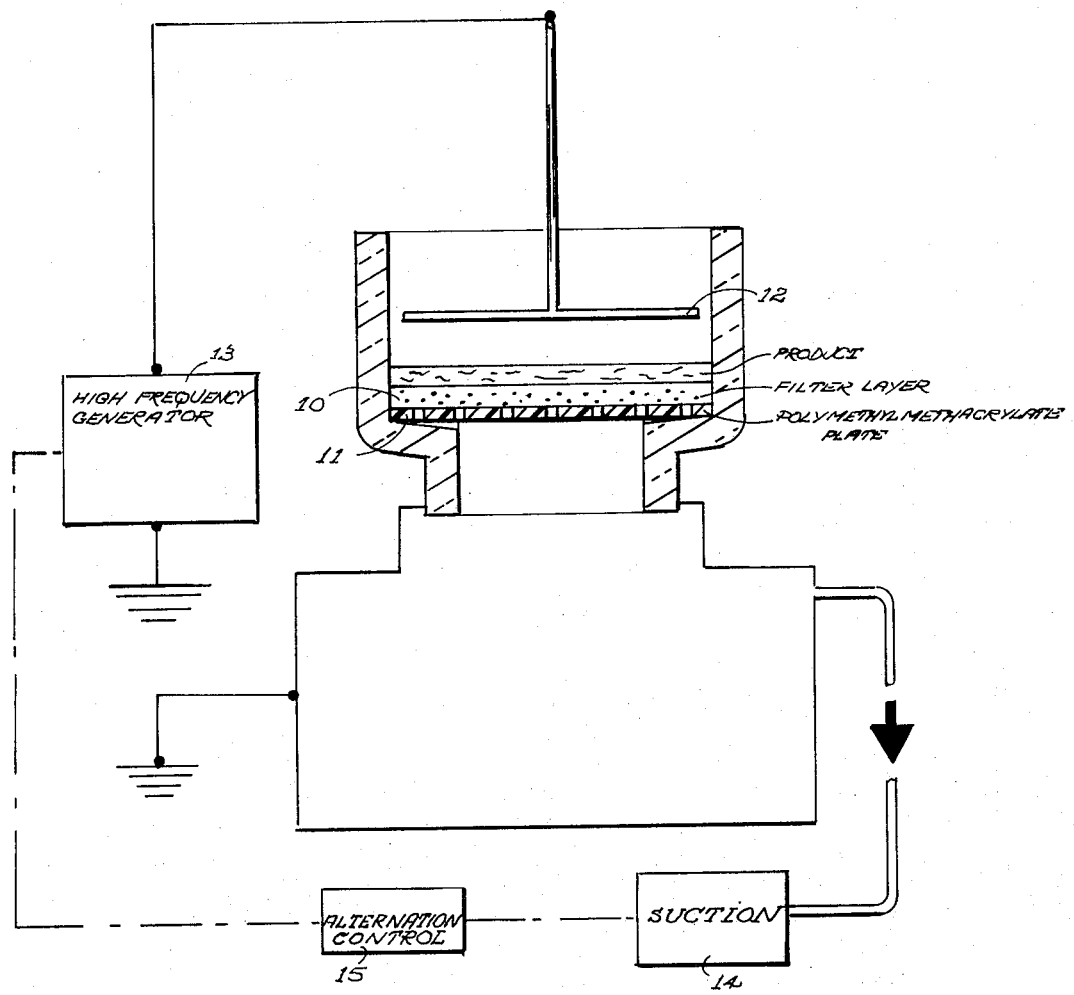
FIG. 1 is a diagram of a filter according to the invention.

In FIG. 1 of the drawing, there is shown a filter system according to the present invention in which a filter layer 10 is carried by a polymethylmethacrylate plate 11 and electromagnetic energy is applied from above by an electrode 12 connected to a high-frequency generator 13. The mechanical dehumidification pressure is applied by a suction source 14 and means 15 is provided for alternately and iteratively operating the mechanical dehumidification device and the source of electromagnetic energy.

Figure 2:
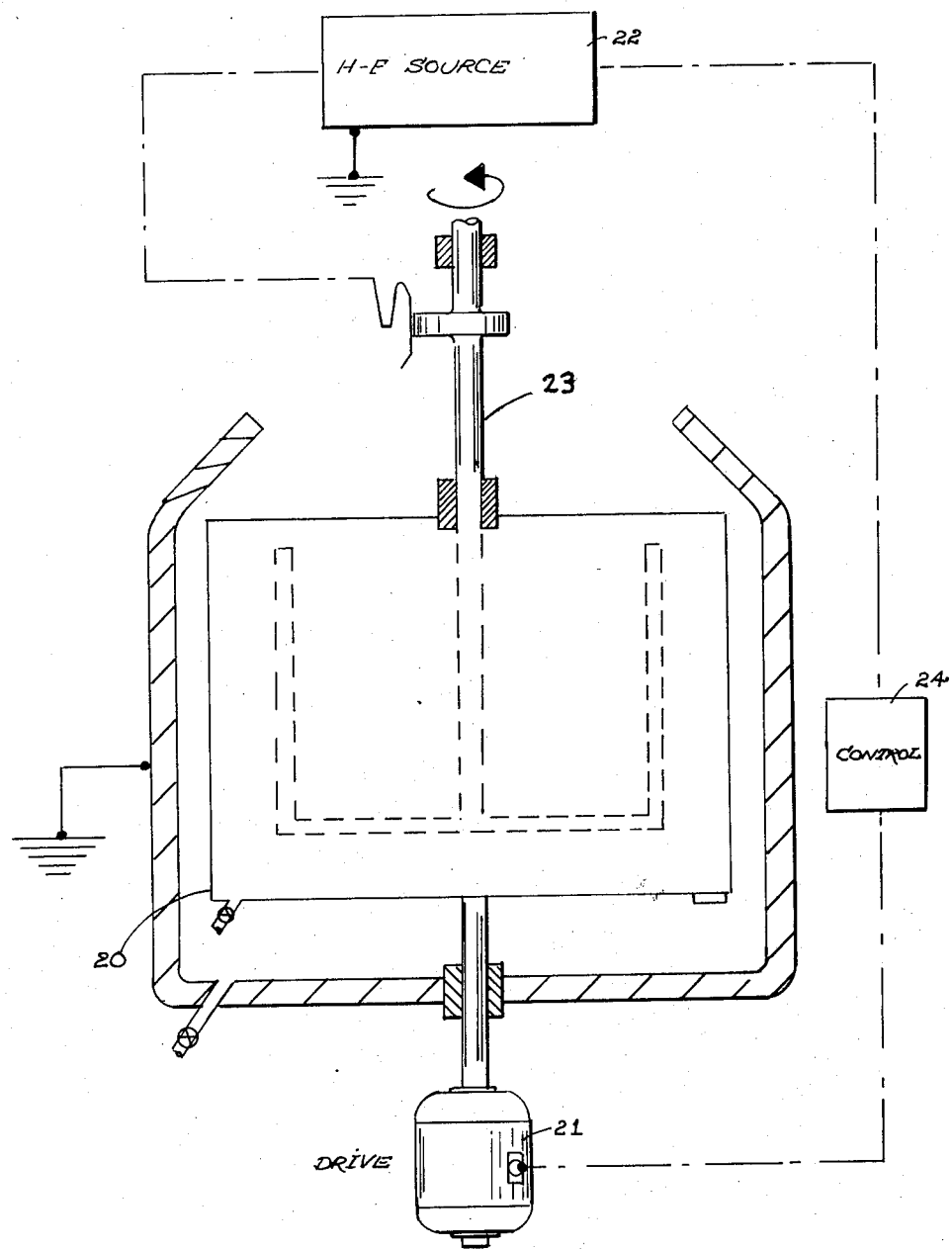
FIG. 2 is a diagram of a centrifuge.

In FIG. 2, the mechanical dehumidification pressure is applied by centrifugal force, e.g., by rotation of a vessel 20 via a drive 21. In this embodiment as well, electromagnetic energy is supplied from a high-frequency source 22 via an electrode 23 and alternate operation of the electromagnetic and drive means is effected by a control 24.

What we claim is:

1. A process for the removal of moisture from a moist solid material, comprising the steps of:
    a. applying a pressure difference to said material on a filter layer across the two sides thereof to force moisture therefrom;
    b. applying electromagnetic energy to said material to intrinsically heat the same to a temperature maintained below the vaporization point of the moisture and sufficient to decrease the viscosity of the moisture; and
    means for operating both of the afore-mentioned means iteratively and alternately in immediate succession.

2. An apparatus for the removal of moisture from a moist material, comprising:
    means for applying a pressure difference to said material on a filter surface across the two sides thereof to expel moisture therefrom;
    means for applying electromagnetic energy to said material to intrinsically heat the same to a temperature below the vaporization point of the moisture but sufficient to reduce the viscosity of said material; and
    means for operating both of the afore-mentioned means iteratively and alternately in immediate succession.
    means for applying electromagnetic energy to said material to intrinsically heat the same to atemperature below the vaporization point of the moisture but sufficient to reduce the viscosity of said material; and
    means for operating both of the afore-mentioned means iteratively and alternately in immediate succession

* * * * *